United States Patent [19]
Fujita et al.

[11] Patent Number: 5,527,834
[45] Date of Patent: Jun. 18, 1996

[54] WATERPROOF PLASTIC FOAM

[75] Inventors: Naoshi Fujita; Tadashi Yano; Satoshi Kondoh, all of Aichi, Japan

[73] Assignee: Inoac Corporation, Tokyo, Japan

[21] Appl. No.: 496,164

[22] Filed: Jun. 28, 1995

[30] Foreign Application Priority Data

Nov. 30, 1994 [JP] Japan .................................. 6-323594

[51] Int. Cl.$^6$ .................................................. C08G 18/34
[52] U.S. Cl. ........................................... 521/157; 521/130
[58] Field of Search ..................................... 521/130, 157

[56] References Cited

U.S. PATENT DOCUMENTS

| | | | |
|---|---|---|---|
| 2,984,679 | 5/1961 | Ehrlich et al. | 260/404.5 |
| 3,201,359 | 8/1965 | Herrick et al. | 260/2.5 |
| 4,524,157 | 6/1985 | Stamberger | 521/157 |
| 4,539,340 | 9/1985 | Stamberger | 521/157 |
| 4,925,881 | 5/1990 | Udding | 521/130 |
| 4,960,804 | 10/1990 | Doerge | 521/130 |

FOREIGN PATENT DOCUMENTS

| | | | |
|---|---|---|---|
| 2-55470 | 11/1990 | Japan | C09K 3/10 |
| 4-63912 | 10/1992 | Japan | C09K 3/10 |
| 5-48274 | 7/1993 | Japan | C09K 3/10 |

*Primary Examiner*—Morton Foelak
*Attorney, Agent, or Firm*—Sughrue, Mion, Zinn, Macpeak & Seas

[57] ABSTRACT

The present invention provides a waterproof plastic foam such as waterproof polyurethane foam which can keep the inherent properties of the foam and exhibit low gas permeability and water absorption, excellent water-sealing properties and hence a stable waterproofness. A waterproof plastic foam obtained by a process which comprises foaming a foamable composition comprising a polyisocyanate, a compound containing at least two active hydrogen groups, a compound containing at least one ester bond, a catalyst, a blowing agent and a foam stabilizer, and then curing the foam is described, wherein the compound containing at least one ester bond is a product of the reaction of any one of a monocarboxylic acid having not less than 9 carbon atoms, an aliphatic dicarboxylic acid having not less than 8 carbon atoms and an alicyclic dicarboxylic acid having not less than 8 carbon atoms with a monoalcohol having not less than 10 carbon atoms, and the compound containing at least one ester bond is incorporated in an amount of from 7 to 100 parts by weight based on 100 parts by weight of the compound containing at least two active hydrogen groups. A waterproof plastic foam obtained by a process which comprises foaming a foamable composition comprising a polyisocyanate, a compound containing at least two active hydrogen groups, a compound containing ester bonds, a catalyst, a blowing agent and a foam stabilizer, and then curing the foam is also described, wherein the compound containing ester bonds is made of oleic acid and one component selected from the group consisting of butadiene polyol, adduct of bisphenol A with propylene oxides and castor oil, and the compound containing ester bonds is incorporated in an amount of from 7 to 100 parts by weight based on 100 parts by weight of the compound containing at least two active hydrogen groups.

20 Claims, No Drawings

WATERPROOF PLASTIC FOAM

FIELD OF THE INVENTION

The present invention relates to a waterproof plastic foam which exhibits a sufficiently low gas permeability and low water absorption and enhanced adhesion properties to the adherend developed by the effect of a hydrophobic ester compound incorporated therein to provide excellent water-sealing properties and hence maintain a stable overall waterproofness. The waterproof plastic foam of the present invention can be used as a material which must avoid water absorption to attain better sanitary conditions, e.g., sealing material, caulking material, cushioning material for mattress.

BACKGROUND OF THE INVENTION

Heretofore, plastic foams such as polyurethane foam which is used as a sealing material, caulking material or the like have been rendered waterproof.

As the method for rendering the plastic foam waterproof there have been known the following methods:

(1) To reduce the cell diameter and hence increase the surface area of the foam with the same density, providing a lower gas permeability;

(2) To incorporate paraffin, coal tar, asphalt, polybutene, dialkyl phthalate, petroleum resin obtained by the polymerization of a $C_{4-9}$ fraction in cracked naphtha, etc. in the components to be blended (see JP-A-55-71777 (The term "JP-A" as used herein means an "unexamined published Japanese patent application"));

(3) To use a hydrophobic polyol and use a specific organosilicon compound as a foam stabilizer, rendering the foam water-repellent and hence enhancing the waterproofness of the foam (see JP-A-3-68677); and (4) To post-treat the foam with a commercial water repellent (e.g., Octex EM, available from Hodogaya Chemical Co., Ltd.), silicone wax, perfluoroalkyl compound or the like.

However, the foregoing methods (1) to (4) have the following disadvantages:

In accordance with the method (1), closed cells can be easily formed, giving a larger compression set. Therefore, when used as a sealing material or caulking material under pressure over a prolonged period of time, such a foam loses elasticity and remains distorted. When some trouble produces a gap between the foam and the adherend, the distorted foam cannot recover to fill up the gap, causing water leakage. Accordingly, such a foam cannot be used over a prolonged period of time and thus exhibits a poor durability.

Among the additives to be used in the method (2), paraffin, coal tar or asphalt provides the various components with a poor compatibility, giving ununiform cell shape, size and distribution. Further, since the various components, including plasticizer, exhibit a poor compatibility, they can bleed from and stain the surface of the foam in a relatively short period of time, making it impossible to maintain a desired waterproofing effect. Further, when a polybutene or petroleum resin is added, the resulting foam shows no change in physical properties but has a larger cell diameter that provides a higher gas permeability, impairing the effect that would be developed by the addition of the hydrophobic material.

In accordance with the method (3) which comprises the use of a specific polyol and foam stabilizer, the resulting foam becomes heterogeneous and thus exhibits dispersed gas permeability and water-sealing properties, making it impossible to exert a sufficient waterproofing effect. Further, such a foam is poor in physical properties such as compression set at a temperature as high as 80° C. When a hydrophobic filler such as hydrocarbon compound is added to such a hydrophobic polyol, the shape and other properties of the resulting cells become uniform because the polyol is well compatible with the additives. However, it is difficult to reduce the gas permeability of the foam due to the effect of a large amount of additives, making it impossible to obtain sufficient water-sealing properties. In addition, the compression set of the foam is further worsened, causing a strain rise after a prolonged compression.

The method (4) is effected as a step following the preparation of the foam and thus normally requires complicated heating or pressing that reduces the productivity.

SUMMARY OF THE INVENTION

It is therefore an object of the present invention to provide a waterproof plastic foam which is so excellent in properties such as compression set that it can serve as a waterproof plastic foam and can maintain a stable overall waterproofness, i.e., sufficiently low gas permeability and water absorption and excellent water-sealing properties.

The foregoing object of the present invention will become more apparent from the following detailed description and examples.

The first aspect of the present invention concerns a waterproof plastic foam obtained by a process which comprises foaming a foamable composition comprising a polyisocyanate, a compound containing at least two active hydrogen groups, a compound containing at least one ester bond, a catalyst, a blowing agent and a foam stabilizer, and then curing the foam, wherein the compound containing at least one ester bond is a product of the reaction of any one of a monocarboxylic acid having not less than 9 carbon atoms, an aliphatic dicarboxylic acid having not less than 8 carbon atoms and an alicyclic dicarboxylic acid having not less than 8 carbon atoms with a monoalcohol having not less than 10 carbon atoms, and the compound containing at least one ester bond is incorporated in an amount of from 7 to 100 parts by weight based on 100 parts by weight of the compound containing at least two active hydrogen groups.

The fourth aspect of the present invention concerns a waterproof plastic foam obtained by a process which comprises foaming a foamable composition comprising a polyisocyanate, a compound containing at least two active hydrogen groups, a compound containing ester bonds, a catalyst, a blowing agent and a foam stabilizer, and then curing the foam, wherein the compound containing ester bonds is made of oleic acid and one component selected from the group consisting of butadiene polyol, adduct of bisphenol A with propylene oxide and castor oil, and the compound containing ester bonds is incorporated in an amount of from 7 to 100 parts by weight based on 100 parts by weight of the compound containing at least two active hydrogen groups.

DETAILED DESCRIPTION OF THE INVENTION

The term "excellent in waterproofness" as used herein is meant to indicate a foam having an excellent hydrophobicity, microfine cells, a low gas permeability, a low water absorption and excellent water-sealing properties.

The dimer acid which constitutes the ester compound to be incorporated in the waterproof plastic foam according to the third aspect of the present invention can be obtained by the heat polymerization of a refined vegetable aliphatic acid derived from a drying oil, semidrying oil, etc. The heat polymerization of an alkyl ester of unsaturated aliphatic acid such as linoleic acid produces a conjugated double bond. Further, Diels Alder reaction (synthesis of diene) occurs to produce a dimer acid. Since most dimer acids are produced from an unsaturated aliphatic acid having 18 carbon atoms as a starting material, the resulting products contain not only a dimer acid as a main component but also a small amount of a trimer acid and a monomer acid. As an optimum example of such a dimer acid, the following structural formula of a dimer acid obtained from linoleic acid and oleic acid will be given below.

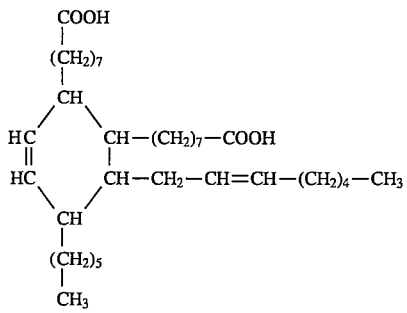

The ninth and tenth aspects of the present invention concerns the waterproof plastic foam according to the first and fourth aspects of the present invention, respectively, which comprises a monofunctionally-terminated compound containing a hydrocarbon group containing not less than 6 carbon atoms at one end or in the middle position and one active group reactive with an isocyanate group contained in the polyisocyanate or one active group reactive with an active hydrogen group contained in the compound containing at least two active hydrogen groups at the other end (These active groups are bonded to a carbon atom at the end of the molecular chain or a carbon atom adjacent to the carbon atom).

In the present invention, as the components to be blended with the material system there may be used as essential components a polyisocyanate, a compound containing at least two active hydrogen groups, a compound containing at least one ester bond for improving the waterproofness of the foam, a catalyst, a blowing agent and a foam stabilizer. Further, a monofunctionally-terminated compound and other components which have heretofore been used in the production of urethane foams can be used as arbitrary components without any special restriction. As other arbitrary components there may be used fire retardant, plasticizer, filler and oxidation inhibitor. Examples of the foregoing polyisocyanate employable in the present invention include aromatic polyisocyanates such as tolylenediisocyanate (TDI), diphenylmethanediisocyanate (MDI), polymeric MDI, naphthalenediisocyanate, paraphenylenediisocyanate, xylenediisocyanate (XDI), tetramethylxylenediisocyanate and dimethyldiphenyldiisocyanate, aliphatic polyisocyanates such as hexamethylenediisocyanate, hydrogenated MDI, isophorone-diisocyanate, lysinediisocyanate, hydrogenated XDI and cyclohexyldiisocyanate, and modification products thereof. Particularly preferred among these polyisocyanates are TDI, MDI and modification products thereof.

Examples of the compound containing at least two active hydrogen groups of the present invention include polyol and polyamine. Examples of the polyol employable in the present invention include polyether polyol, polyester polyol and modification products thereof. Examples of the polyamine employable in the present invention include monomolecular diamine, triamine, aromatic diamine and amino-capped polyether polyamine. These compounds containing at least two active hydrogen groups may be used singly. Alternatively, two or more of these compounds may be used in combination, e.g., polyol and polyamine.

The foregoing polyether polyol can be obtained by random or block addition polymerization of a starting material containing two or more active hydrogen groups with an alkylene oxide in the presence of a basic catalyst.

For example, a compound containing a hydroxyl group as an active group such as propylene glycol, dipropylene glycol, glycerin, trimethylol propane, pentaerythritol, sorbitol, cane sugar and saccharose or an amine active hydrogen compound such as polyamine (e.g., ethylenediamine, tolylenediamine) may be subjected to addition polymerization with an alkylene oxide such as ethylene oxide, propylene oxide, trimethylene oxide and 3,3-dimethyltri(methylene)-oxide.

Further, a so-called polymer polyol obtained by graft polymerization of such a polyether polyol with acrylonitrile, styrene or the like or a polyether polyol obtained by ring opening polymerization or copolymerization of a cyclic ether such as tetrahydrofuran and dioxane may be used.

Examples of the basic catalyst employable in the present invention include tertiary amines and organotin compounds. Representative examples of these compounds include triethylenediamine, triethylamine, N-methylmorpholine, N-ethylmorpholine, N,N,N',N'-tetramethyl-hexamethylenediamine, stannous octoate and dibutyltin dilaurate. However, the present invention is not limited to these compounds.

Examples of the foregoing polyester polyol include polyester polyols obtained by the condensation of compounds containing hydroxyl group selected from the group consisting of ethylene glycol, diethylene glycol, propylene glycol, butanediol, 1,6-hexanediol, 2,5-hexanediol, 3-methyl-1,5-pentanediol, neopentyl glycol, glycerin, trimethylolpropane, trimethylolethane, pentaerythritol, diglycerin, sorbitol and cane sugar with a carboxylic acid such as succinic acid, adipic acid, maleic acid, fumaric acid, phthalic acid, isophthalic acid, succinic anhydride, maleic anhydride and phthalic anhydride, and lactone polyols such as ring opening polymerization product of ε-caprolactone and ring opening polymerization product of β-methyl-67-valerolactone.

Examples of the polyamine include polyether polyamines obtained by capping the functional end groups of the foregoing polyether polyols with amino groups such as diamine, triamine and aromatic diamine.

Examples of the blowing agent employable in the present invention include blowing agents used in the preparation of foams, such as water, chlorofluorocarbon, particularly HCFC containing hydrogen atom (e.g., $CHCl_2F$, $CHClF_2$), air, nitrogen, pentane, methylene chloride, nitroalkane and formic acid.

As the foregoing plasticizer there may be used tricresyl phosphate or the like. As the foregoing fire retardant there may be used a phosphorus halide such as tris(β-chloropropyl)phosphate. The sum of the added amount of the plasticizer, fire retardant, etc. is not limited unless the waterproofness of the foam is impaired.

In the synthesis of the compound containing at least one ester bond of the first aspect of the present invention, a monoalcohol containing not less than 10 carbon atoms, and any one of a monocarboxylic acid containing not less than 9 carbon atoms, an aliphatic dicarboxylic acid containing not less than 8 carbon atoms and an alicyclic dicarboxylic acid containing not less than 8 carbon atoms can be used. In general, such an ester compound is mixed with a compound containing at least two active hydrogen groups, a blowing agent, etc. To the mixture is then added a polyisocyanate. The mixture is then stirred to prepare a foamable composition. The foamable composition is then foamed and cured to obtain a waterproof plastic foam.

In general, to a mixture of such a compound containing at least one ester bond, a compound containing at least two active hydrogen groups, blowing agents, foam stabilizers, catalysts and fillers is added a polyisocyanate in an amount of from 0.9 to 1.3 equivalent of an isocyanate group per equivalent of hydroxyl group with stirring. The preparation of the foregoing mixture is effected at normal temperature. To 100 parts by weight of the compound containing at least two active hydrogen groups may be added from 7 to 100 parts by weight of the compound containing at least one ester bond, from 1.5 to 4 parts by weight of water as a blowing agent, from 0.5 to 2.5 parts by weight of the foam stabilizer and from 0.3 to 1.5 parts by weight of the catalyst.

Further, the plasticizer and filler may be properly added in an amount such that the desired properties of the resulting foam is not impaired.

Examples of the monoalcohol containing not less than 10 carbon atoms include saturated monoalcohols such as decyl alcohol, isodecyl alcohol, 4-tert-butyl cyclohexanol, lauryl alcohol, myristyl alcohol, cetyl alcohol, stearyl alcohol, eicosyl alcohol, ceryl alcohol, isolauryl alcohol and isostearyl alcohol, and unsaturated monoalcohols such as oleyl alcohol.

Examples of the monocarboxylic acid containing not less than 9 carbon atoms include saturated monocarboxylic acids such as capric acid, undecanoic acid, lauric acid, myristic acid, palmitic acid, margaric acid, stearic acid, arachidic acid, behenic acid and lignoceric acid, and unsaturated monocarboxylic acids such as oleic acid.

Examples of the aliphatic or alicyclic dicarboxylic acid containing not less than 8 carbon atoms employable in the present invention include aliphatic dicarboxylic acids such as azelaic acid, sebacic acid, brassylic acid and thapsinic acid, and alicyclic dicarboxylic acids such as dimer acid.

The foregoing compound containing at least one ester bond can be incorporated in an amount of from 7 to 100 parts, preferably from 10 to 70 parts, particularly from 20 to 70 parts by weight based on 100 parts by weight of the foregoing compound containing at least two active hydrogen groups. If the added amount of the compound containing at least one ester bond falls within the above defined range, a waterproof plastic foam excellent in water-sealing properties and other properties can be obtained without impairing its inherent excellence in physical properties such as compression set. If the added amount of the compound containing at least one ester bond falls less than 7 parts by weight, the desired effect cannot be thoroughly exerted. On the contrary, if the added amount of the compound containing at least one ester bond exceeds 100 parts by weight, the inherent properties of the plastic foam are impaired.

In Examples 22 to 24 (Table 5), the added amount of a distearyl of dimer acid as a compound containing at least one ester bond was changed. Example 24, in which the distearyl of dimer acid was added in an amount of 7 parts by weight, exhibited a gas permeability of 10 seconds, a water absorption of 2.4% and water-sealing properties of 8 hours. As a better example, Example 23, in which the distearyl of dimer acid was added in an amount of 10 parts by weight, exhibited a gas permeability of 15 seconds, a water absorption of 1.2% and water-sealing properties of 12 hours. Even better examples show that a preferred added amount of the distearyl of dimer acid is from 20 to 70 parts by weight to provide very excellent water-sealing properties. Example 22, in which the distearyl of dimer acid was added in an amount of 30 parts by weight, exhibited a gas permeability of 20 seconds, a water absorption of 0.4% and water-sealing properties of 24 hours. Example 12, in which the distearyl of dimer acid was added in an amount of 60 parts by weight, exhibited a gas permeability of 50 seconds, a water absorption of 0.4% and water-sealing properties of 24 hours.

As defined in the second aspect of the present invention, the number of carbon atoms contained in the monoalcohol and monocarboxylic acid is preferably from 14 to 36, and the number of carbon atoms contained in the dicarboxylic acid is preferably from 15 to 36. If the number of carbon atoms falls within this range, the hydrophobicity developed by long chain alkyl group can effectively act on the waterproofness of the foam. Preferred examples of these monoalcohols, monocarboxylic acids and dicarboxylic acids include $C_{14-18}$ monoalcohols such as tetradecyl alcohol, hexadecyl alcohol and stearyl alcohol and $C_{15-18}$ monocarboxylic acids and dicarboxylic acids such as palmitic acid, margaric acid, stearic acid, oleic acid, linoleic acid and thapsinic acid. These compounds are commercially available as mass production and thus are practical.

The foregoing definition of the upper limit of the number of carbon atoms contained in these compounds is not for the purpose of providing hydrophobicity but is attributed to the fact that if the number of carbon atoms contained in these compounds exceeds the above defined upper limit, they become solid and can hardly be handled at normal or low temperatures.

The most preferred example of the ester compound is a product of the reaction of a stearyl alcohol such as n-stearyl alcohol and isostearyl alcohol with a dimer acid as an alicyclic dicarboxylic acid as defined in the third aspect of the present invention. If such an ester compound is used, the effect of the present invention can be maximized.

As an example of the synthesis of the compound containing ester bonds, the synthesis of a distearyl of dimer acid will be described hereinafter.

1 mol (560 g) of a dimer acid and 2 mol (540 g) of stearyl alcohol were mixed. The mixture was then heated to a temperature of 150° to 180° C. with stirring while nitrogen gas was being introduced into the reactor. The reaction mixture was then allowed to stand at this temperature for 2 hours. At the same time, the reaction system was evacuated to 20 mmHg to remove the by-produced water. After 1.5 hours, one catalyst selected from the group consisting of p-toluene-sulfonic acid, calcium acetate, calcium octylate, dibutyltin dilaurate and stannous octylate was added to the reaction system in an amount of from 0.2 to 0.8 g. The reaction was considered to have been completed when the acid value of the reaction product reached not more than 5.0. The reaction product gradually cooled to normal temperature.

Other examples of the foregoing compound containing at least one ester bond include an ester of butadiene polyol with oleic acid, an ester bond of a propylene oxide adduct of bisphenol A with oleic acid, and ester bonds of castor oil with oleic acid, as defined in the fourth aspect of the present invention. If at least one of the three compounds containing at least one ester bond is used, a waterproof plastic foam having excellent physical properties and water-sealing properties can be obtained as in the first aspect of the present invention.

Besides the foregoing compound containing at least one ester bond, the waterproof plastic foam of the present invention may comprise a monofunctionally-terminated compound containing a hydrocarbon group having not less than 6 carbon atoms at one end or in the middle position and one active group reactive with an isocyanate group contained in the foregoing polyisocyanate or one active group reactive with an active hydrogen group contained in the foregoing compound containing at least two active hydrogen groups at the other end (These active groups are bonded to a carbon atom at the end of the molecular chain or a carbon atom adjacent to the carbon atom) as defined in the ninth and tenth aspects of the present invention. The ninth and tenth aspects of the present invention include the waterproof plastic foam of the first or fourth aspect of the present invention, which comprises the monofunctionally-terminated compound.

The hydrocarbon group in the foregoing monofunctionally-terminated compound may be a straight-chain or branched, saturated or unsaturated group. Further, the hydrocarbon group may be an aliphatic group, an aromatic group, alicyclic group or group containing these groups. The monofunctionally-terminated compound may contain these various hydrocarbon groups, singly or in admixture.

The number of carbon atoms contained in the hydrocarbon group is preferably from 6 to 48, particularly from 8 to 36. It can be properly determined taking into account the required waterproofness, handling, etc. Further, one such a monofunctionally-terminated compound containing the foregoing hydrocarbon group at one end or in the middle position and one active group reactive with an isocyanate group contained in the foregoing polyisocyanate or one active group reactive with an active hydrogen group contained in the foregoing compound containing at least two active hydrogen groups at the other end (These active groups are bonded to a carbon atom at the end of the molecular chain or a carbon atom adjacent to the carbon atom) may be used. Alternatively, two or more monofunctionally-terminated compounds may be used in combination as defined in the eleventh and twelfth aspects of the present invention.

The term "monofunctionally-terminated compound" as used herein is meant to indicate a compound having a plurality of molecular terminals only one of which is terminated by the foregoing active group. Examples of such a monofunctionally-terminated compound include a compound containing a group such as —NH—, —O—, —S—, —CO— and —N(R)— (in which R represents an alkyl group) in the middle position. Preferably, at least one of the hydrocarbon group connected to both ends of such a group has not less than 6 carbon atoms.

The foregoing monofunctionally-terminated compound comprises one or more compounds selected from the group consisting of monoisocyanate, monoalcohol and monoamine. Specific examples of the foregoing monoisocyanate include octadecyl isocyanate and monoisocyanate derived from a mixture of hexadecylamine and octadecylamine. Specific examples of the foregoing monoalcohol include 1-octanol, 1-decanol, lauryl alcohol, oleyl alcohol, branched higher alcohol and monoalcohol terminated by —O—, —S—, etc. (e.g., ROCH$_2$—CH$_2$OH). Specific examples of the foregoing monoamine include octylamine, laurylamine, octadecylamine and monoamine terminated by —O—, —S—, etc.

The monofunctionally-terminated compound is previously mixed with the polyisocyanate component or polyol component as a main component. If the monofunctionally-terminated compound is a monoisocyanate, it is mixed with the polyisocyanate component. If the monofunctionally-terminated compound is a monoalcohol or monoamine, it is mixed with the compound containing at least two active hydrogen groups, mostly polyol component and a catalyst, a blowing agent, etc. Thereafter, the two components were mixed, stirred, foamed, and then cured to prepare a plastic foam.

Alternatively, the monofunctionally-terminated compound may be introduced as a third component into a mixing chamber during the mixing of the compound containing at least two active hydrogen groups and the isocyanate component. On this occasion where the monofunctionally-terminated compound is previously blended with a main component such as the compound containing at least two active hydrogen groups, the order of blending of the compound containing at least one ester bond and the monofunctionally-terminated compound is not a big problem. The two components may be mixed, and then blended with the compound containing at least two active hydrogen groups.

Any monofunctionally-terminated compound has a long-chain hydrocarbon group. Therefore, it is normally less reactive than the polyisocyanate and the compound containing at least two active hydrogen groups as main components. Accordingly, even if the monofunctionally-terminated compound is added before or shortly after the blending of the main component, it does not preferentially react. However, if a monofunctionally-terminated compound having a relatively high reactivity is used, it is preferably added during the stirring of the mixture of these main components, i.e., while the reaction for the production of foam is in progress, to assure that the main components can be reacted preferentially.

The added amount of the monofunctionally-terminated compound is normally from 0.1 to 35 parts by weight, preferably from 0.1 to 25 parts by weight, particularly from 0.3 to 10 parts by weight based on 100 parts by weight of the compound containing at least two active hydrogen groups, as defined in the thirteenth and fourteenth aspects of the present invention. The added amount of the monofunctionally-terminated compound may be determined by the usage, purpose and required waterproofness taking into account the number of carbon atoms contained in the hydrocarbon group in the monofunctionally-terminated compound, the kind of functional group and the difference in reactivity with the polyisocyanate and the compound containing at least two active hydrogen groups as main components. If the added amount of the monofunctionally-terminated compound falls less than 0.1 parts by weight, sufficient waterproofness cannot be provided. On the contrary, if the added amount of the monofunctionally-terminated compound exceeds 35 parts by weight, foam can be hardly produced, and the resulting foam, if produced, does not exhibit its inherent physical properties.

When the monofunctionally-terminated compound is used in excess, even if a normal foam can be obtained, the excess monofunctionally-terminated compound can be left unreacted and incorporated in the foam. The unreacted monofunctionally-terminated compound can gradually bleed out the surface of the foam and stain the surface of the foam as seen with the conventional waterproof foam comprising a hydrophobic material physically incorporated therein.

If the compound containing at least one ester bond and the monofunctionally-terminated compound have a poor compatibility with other compositions, i.e., the compound containing at least two active hydrogen groups, polyisocyanate, fire retardant, filler, it is preferred that they are previously dissolved or dispersed in a plasticizer and/or solvent (e.g., methylene chloride, cellosolve acetate) to enhance its compatibility With these compositions. In general, a higher alcohol or the like having a higher molecular weight has a higher melting point and thus can be more hardly handled. Therefore, it may be used in combination with a plasticizer such as tricresyl phosphate and tris-β-chloropropyl phosphate so far as the waterproofness of the resulting foam is not reduced.

The blending of the compound containing at least one ester bond, optionally the monofunctionally-terminated compound, provides a plastic foam having a sufficiently excellent waterproofness. In order to further enhance the waterproofness of the plastic foam, the main component such as polyisocyanate and polyol is preferably hydrophobic rather than hydrophilic to provide a higher waterproofing effect. Further, if the surface area of the foam is as large as possible, a high waterproofing effect can be exerted. Therefore, the foam cell is preferably as small as possible. The number of cells in the waterproof plastic foam of the present invention is preferably from 60 to 120/25 mm, particularly not less than 80/25 mm. If the number of cells falls below 60/25 mm, a stable waterproofness cannot be obtained.

The technique involving the blending of a hydrophobic substance such as long-chain aliphatic hydrocarbon compound as an additive for the purpose of waterproofing the plastic foam is well known. However, it is also known that such a hydrocarbon compound also serves as a cell opener that provides a larger cell diameter resulting in a higher gas permeability and hence a reduced waterproofness. Accordingly, an approach has been proposed which comprises the use of a relatively less hydrophobic aromatic hydrocarbon compound so that gas permeability and waterproofness can be well balanced. However, even this approach is disadvantageous in that a stably low gas permeability can be hardly attained, making it impossible to obtain a foam excellent in waterproofness such as water-sealing properties.

In the present invention, the compound containing at least one ester bond obtained by the condensation of any one of a monocaboxylic acid, an aliphatic dicarboxylic acid and an alicyclic dicarboxylic acid with a monoalcohol is used as a hydrophobic additive. By introducing an ester group into the molecule, a foam having fine cells can be stably produced. Thus, the gas permeability of the foam can be minimized, providing an excellent waterproofness. Further, since a foamable composition comprises the compound containing at least one ester bond, the compatibility with the polyester polyol containing ester bonds is much superior to that of ordinary long-chain hydrocarbon compound, providing the starting material of the plastic foam with an excellent workability and minimizing bleeding from the plastic foam with time. Further, since the hydrophobic additive can properly bleed out, the plastic foam, if used as a sealing material, can exhibit enhanced adhesion properties to the adherend to provide a stably excellent waterproofness, particularly water-sealing properties.

In the ninth and tenth aspects of the present invention, a monofunctionally-terminated compound is introduced into the molecule of the foaming resin by a chemical reaction to render the resin waterproof. Since the monofunctionally-terminated compound contains a hydrocarbon group containing not less than 6 carbon atoms at one end or in the middle position and one active group reactive with an isocyanate group contained in the foregoing polyisocyanate or one active group reactive with an active hydrogen group contained in the foregoing compound containing at least two active hydrogen groups at the other end (These active groups are bonded to a carbon atom at the end of the molecular chain or a carbon atom adjacent to the carbon atom), it is normally less reactive than the polyisocyanate and polyol as main components. Therefore, at the gel time of foam during the reaction of the main components or the last time of the total reaction process, the monofunctionally-terminated compound reacts with an active hydrogen group such as isocyanate group, hydroxyl group and amino group present in the vicinity of the surface of the foam to make a chemical bond to the plastic foam via urethane bond, urea bond, alohanate bond or burette bond. As a result, the surface of the foam is covered with a highly hydrophobic long-chain hydrocarbon group or the like.

Since the monofunctionally-terminated compound is connected to the surface of the foam as mentioned above, the foam can be rendered thoroughly hydrophobic even if the added amount of the monofunctionally-terminated compound is very small. Further, once the active group in the monofunctionally-terminated compound has been connected to the active hydrogen group such as isocyanate group, hydroxyl group and amino group on the surface of the foam, it can attain an extremely stable bond to the surface of the foam. As a result, a large number of highly hydrophobic long-chain hydrocarbon groups or aromatic groups are stably present on the surface of the foam.

In order to render a waterproof plastic foam hydrophobic, it has been commonly practiced to use a compound containing a long-chain alkyl group as an additive. The present invention is the same as the prior art in that such a compound containing a long-chain alkyl group is used as an additive. However, the present invention features that the additive used not only is a compound containing a long-chain alkyl group but also comprises at least one ester bond introduced in between the molecular chains of the alkyl group. The additive comprising at least one ester bond incorporated therein exhibits an enhanced affinity or compatibility with a polar foamable composition such as water, and thus provides an excellent waterproofness. Examples of the additive employable in the present invention include those classified as dicarboxylic acid diester compound. Most of dicarboxylic acid diester compounds cited in the prior art are used as plasticizers. Thus, the prior art is obviously different from the present invention in the effect and purpose of these dicarboxylic acid diester compounds.

The number of carbon atoms of the hydrocarbon group contained in the dicarboxylic acid diester used in the prior art is 8 at most as typified by DOP (dioctyl phthalate). Further, also in the case of DOS (dioctyl sebacate), both the alcohol and dibasic acid constituting the ester have a small number of carbon atoms. Therefore, the use of DOP or DOS provides very poor water-sealing properties as shown in Comparative Examples 1, 4, 5 and 6. Thus, these compounds are obviously different from the compound containing at least one ester bond the monoalcohol of which has not less than 10 carbon atoms according to the present invention.

Thus, the dicarboxylic acid diester as an additive of the present invention is a product of the reaction of a monoalcohol containing a hydrocarbon group having not less than 10 carbon atoms with a carboxylic acid having not less than 8 carbon atoms. Further, the present invention is obviously different from the prior art in that the use of a long-chain hydrocarbon group provides the foam with hydrophobicity and ester bonds are positively introduced.

As previously mentioned, the present invention employs a compound containing at least one ester bond excellent in the compatibility with the starting material of the foam. In addition, if a monofunctionally-terminated compound is additionally used, the resulting plastic foam exhibits little drop of physical properties and is less subject to drop of water-sealing properties (ability to stop water leakage from the interface with the adherend) when exposed to sunlight. Thus, the plastic foam exhibits little or no change of waterproofness. Accordingly, the present invention is different from the conventional technique wherein a hydrophobic material or a water repellent is physically introduced into a plastic foam.

The waterproof plastic foam according to the first, fourth, fifteenth and sixteenth aspects of the present invention exhibits a gas permeability of from 10 to 60 seconds, preferably from 15 to 60 seconds, more preferably from 18 to 55 seconds, as determined in accordance with JIS P 8117 and a water absorption of from 0.3 to 1.2%, preferably from 0.3 to 0.9%, more preferably from 0.4 to 0.9% and water-sealing properties of not less than 12 hours, preferably not less than 24 hours, as determined by the following evaluation methods:

Water absorption:

A 50×50×20 (thick) mm specimen is vertically compressed by a factor of 50% to a thickness of 10 mm. The specimen is then dipped in water of 23° C. to a depth of 10 cm for 24 hours. The weight increase of the specimen is then measured. The weight increase is represented as a ratio to the volume of the 50% compressed specimen according to the following equation:

$$\% \text{ Water absorption} = \{\text{weight change (g) by dipping/volume (cm}^3\text{)} \text{ of 50\% compressed specimen}\} \times 100$$

Water-sealing properties:

A specimen having a 15 mm×15 mm section is formed into a U-shaped material. The specimen is clamped by two sheets of acrylic resin plates and vertically compressed to a factor of 50% (i.e., to a thickness of 7.5 mm). The specimen is set upright. Water is poured into the U-shaped portion to a height of 100 mm from the inner surface of the U-shaped portion. The time required until water oozes from the external surface of the U-shaped portion is determined.

The present invention will be further described in the following examples and comparative examples, but the present invention should not be construed as being limited thereto.

(1) Components used in examples and comparative examples

1) Polyol i. N-101: diethylene adipate, available from Nihon Polyurethane K. K.; hydroxyl number:56 ii. PPG-3000: polyether polyol obtained by addition polymerization of glycerin with propylene oxide, available from Sanyo Chemical Industries, Ltd.; molecular weight:3,000; hydroxyl number:56 iii. AH405: polyester polyol made of ethylene glycol, 1,4-butanediol and adipic acid, available from Sanyo Chemical Industries, Ltd.; hydroxyl number:60 iv. F-3010: polyester polyol made of 3-methyl- 1,5-pentanediol and adipic acid, available from Kuraray Co., Ltd.; hydroxyl number:56 v. L-2010: polyester polyol obtained by the ring opening polymerization of β-methyl-δ-valerolactone, available from Kuraray Co., Ltd.; hydroxyl number:56 vi. Teslac TA22-193: polyester polyol made of 1,4-butanediol, adipic acid and isophthalic acid, available from Hitachi Chemical Polymer Co., Ltd.; hydroxyl number:56 vii. Teslac 2458: polyester polyol made of diethylene glycol and dimer acid, available from Hitachi Chemical Polymer Co., Ltd.; hydroxyl number:70 viii. Teslac 2460: compound polyol containing a polyester bond made of ethylene glycol, 1,4-butanediol and adipic acid, available from Hitachi Chemical Polymer Co., Ltd.; hydroxyl number: 56

2) Blowing agent: methylene chloride, water

3) Catalyst i. N,N-dimethylaminoethanol (DMAE), available from Nihon Nyukazai K. K.

ii. Stannous octoate

4) Foam stabilizer: SH-193, hydroxyl-containing polyalkyl siloxane copolymer available from Toray Silicone Co., Ltd.

5) Compound containing ester bond (a) Dioctyl sebacate (b) Isostearyl stearate (c) Decyl stearate (d) Oleyl stearate (e) Decyl oleate (f) Stearyl oleate (g) Didecyl sebacate (h) Dioleyl sebacate (i) Diisostearyl sebacate (j) Diester of sebacic acid with a mixture of $C_{32-36}$ higher alcohols (k) Didecyl of dimer acid (l) Dioleyl of dimer acid (m) Distearyl of dimer acid (n) Diester of dimer acid with a mixture of $C_{32-36}$ higher alcohols (o) Compound of butadiene polyol (R-45HT, available from Idemitsu Sekiyu K. K.) and oleic acid (p) Compound of propylene oxide adduct of bisphenol A (Rikaresin P020, available from Shinnihon Rika K. K.) and oleic acid (q) Compound of castor oil ("Seisei Himashiyu", available from Ito Seiyu K. K.) and oleic acid 6) Additive used in comparative examples i. Dioctyl phthalate ii. HV15: polybutene, available from Nihon Sekiyu Kagaku K. K.

iii. FTR-6100: petroleum resin, available from Mitsui Petrochemical Industries, Ltd.

iv. Hisol SAS-LH: petroleum liquid resin, available from Nihon Sekiyu Kagaku K. K.

v. Compound of monool of castor oil (URIC H-31, available from Ito Seiyu K. K.; hydroxyl number: 155) and pure MDI (Millionate MT, available from Nihon Polyurethane K. K.)

7) Monofunctionally-terminated compound i. Octadecyl isocyanate ii. Decyl alcohol iii. Isostearyl alcohol iv. Oleyl alcohol v. Enujecohol C3236: mixture of $C_{32-36}$ higher alcohols, available from Shinnihon Rika K. K.

vi. Emulmine 40: higher alcohol, available from Sanyo Chemical Industries, Ltd.

vii. Nonipole 20: Higher alcohol, available from Sanyo Chemical Industries, Ltd.

viii. Octylamine ix. Octadecylamine

8) Polyisocyanate i. T-80: TDI, available from Nihon Polyurethane K. K.; 80/20 mixture (by weight) of 2,4-TDI/2,6-TDI ii. MR-200: Polymeric MDI, available from Nihon Polyurethane K. K.

(2) Foamable compositions of examples and comparative examples

For Examples 1 to 9, 57.7 parts by weight of polymeric isocyanates were dispersed in an admixture consisting of 100 parts by weight of polyol N-101, 10 parts by weight of methylene chloride, 0.5 part by weight of catalyst DMAE, 1.0 part by weight of foam stabilizer and 60 parts by weight of a variety of ester compounds of this invention with the aid of a disperser run at 1000 rpm at room temperature. The said admixture was previously blended with said components by a mixer at 3000 rpm for 10 minutes. Then total reaction mixture is poured into the box to cure at 160° C. in an oven. Other examples are carried out with the same process.

In Examples 1 to 13, esters made of various alcohols and carboxylic acids were blended with polyisocyanates and polyols as main components to prepare waterproof polyurethane foams. In Examples 1 to 3, stearic acid was used as a carboxylic acid and the kind of alcohols used was changed. In Examples 4 and 5, oleic acid was used as a carboxylic acid and the kind of alcohols used was changed. In Examples 6 to 9, sebacic acid was used as a carboxylic acid and the kind of alcohols used was changed. In Examples 10 to 13, a dimer acid was used as a carboxylic acid and the kind of alcohols used was changed.

Examples 14 to 16 correspond to the fourth aspect of the present invention. In Examples 17 to 21, a distearyl of dimer acid was used as the compound containing ester bonds and the kind of polyols used was changed. In Examples 22 to 24, the added amount of the distearyl of dimer acid was changed. Examples 25 to 33 correspond to the ninth and tenth aspects of the present invention wherein the distearyl of dimer acid was used in combination with various monofunctionally-terminated compounds.

In Comparative Example 1, as an ester compound there was used DOS (dioctyl sebacate), i.e., dibasic acid ester plasticizer made of sebacic acid and octyl alcohol as a monoalcohol having 8 carbon atoms.

In Comparative Examples 2 and 3, the added amount of the distearyl of dimer acid fell less than the lower limit and no compound containing at least one ester bond was used. In Comparative Examples 4 to 15, various hydrophobic additives which are not the compounds containing at least one ester bond of the present invention were blended and the kind of polyols and polyisocyanates used was partially changed in an attempt to prepare waterproof polyurethane foams.

The formulation of Examples 1 to 4 and Examples 5 to 9 are set forth in Table 1 and Table 2, respectively. The formulation of Examples 10 to 13 and Examples 14 to 16 are set forth in Table 3. The formulation of Examples 17 to 21 and Examples 22 to 24 are set forth in Table 4 and Table 5, respectively. The formulation of Examples 25 to 28 and Examples 29 to 33 are set forth in Table 6 and Table 7, respectively. Further, the formulation of Comparative Example 1 is set forth in Table 1. The formulation of Comparative Examples 2 and 3 are set forth in Table 5. The formulation of Comparative Examples 4 to 9 and Comparative Examples 10 to 15 are set forth in Table 8 and Table 9, respectively. The figures in these tables all indicate parts by weight based on 100 parts by weight of polyol.

(3) Method for evaluation of gas permeability, water absorption and water-sealing properties i. Gas permeability: determined according to JIS P 8117
Time required until 100 ml of air passes through a specimen having a thickness of 10 mm ii. Water absorption:
A 50×50×20 (thick) mm specimen is vertically compressed by a factor of 50% to a thickness of 10 mm. The specimen is then dipped in water of 23° C. to a depth of 10 cm for 24 hours. The weight increase of the specimen is then measured. The weight increase is represented as a ratio to the volume of the 50% compressed specimen according to the following equation:

% Water absorption={weight change (g) by dipping/volume ($cm^3$) of 50% compressed specimen}×100 iii. Water-sealing properties:
A specimen having a 15 mm×15 mm section is formed into a U-shaped material. The specimen is clamped by two sheets of acrylic resin plates and vertically compressed to a factor of 50% (i.e., to a thickness of 7.5 mm). The specimen is set upright. Water is poured into the U-shaped portion to a height of 100 mm from the inner surface of the U-shaped portion. The time required until water oozes from the external surface of the U-shaped portion is determined.

The polyurethane foams obtained from the formulations of the foregoing examples and comparative examples were then measured for density, number of cells, compression set, gas permeability, water absorption and water-sealing properties. The results are set forth in the tables below along with the formulations. The measurement of density, number of cells and compression residual stain were conducted in accordance with JIS K 6401, JIS K 6402 and JIS K 6401, respectively.

TABLE 1

| Constituent | Comparative Example 1 | Example 1 | Example 2 | Example 3 | Example 4 |
|---|---|---|---|---|---|
| Polyol N-101 | 100 | 100 | 100 | 100 | 100 |
| Polyisocyanate MR-200 | 57.7 | 57.7 | 57.7 | 57.7 | 57.7 |
| Blowing agent | | | | | |
| Methylene chloride | 10 | 10 | 10 | 10 | 10 |
| Water | 2.4 | 2.4 | 2.4 | 2.4 | 2.4 |
| Catalyst DMAE | 0.5 | 0.5 | 0.5 | 0.5 | 0.5 |
| Foam stabilizer SH-193 | 1.0 | 1.0 | 1.0 | 1.0 | 1.0 |
| Ester | | | | | |
| Dioctyl sebacate | 60 | — | — | — | — |
| Decyl stearate | — | 60 | — | — | — |
| Isostearyl stearate | — | — | 60 | — | — |
| Oleyl stearate | — | — | — | 60 | — |
| Decyl oleate | — | — | — | — | 60 |
| Density (kg/$cm^3$) | 55 | 54 | 55 | 56 | 56 |
| Number of cells/25 mm | 65 | 65 | 60 | 65 | 60 |
| Compression set (%) | 3 | 4 | 5 | 3 | 4 |
| Gas permeability (sec) | 15 | 18 | 21 | 20 | 23 |
| Water absorption (%) | 2 | 0.9 | 0.9 | 0.8 | 0.7 |

TABLE 1-continued

| Constituent | Comparative Example 1 | Example 1 | Example 2 | Example 3 | Example 4 |
|---|---|---|---|---|---|
| Water-sealing properties (hr) | 3 | >24 | >24 | >24 | >24 |

TABLE 2

| Constituent | Example 5 | 6 | 7 | 8 | 9 |
|---|---|---|---|---|---|
| Polyol N-101 | 100 | 100 | 100 | 100 | 100 |
| Polyisocyanate MR-200 | 57.7 | 57.7 | 57.7 | 57.7 | 57.7 |
| Blowing agent | | | | | |
| Methylene chloride | 10 | 10 | 10 | 10 | 10 |
| Water | 2.4 | 2.4 | 2.4 | 2.4 | 2.4 |
| Catalyst DMAE | 0.5 | 0.5 | 0.5 | 0.5 | 0.5 |
| Foam stabilizer SH-193 | 1.0 | 1.0 | 1.0 | 1.0 | 1.0 |
| Ester | | | | | |
| Stearyl oleate | 60 | — | — | — | — |
| Didecyl sebacate | — | 60 | — | — | — |
| Dioleyl sebacate | — | — | 60 | — | — |
| Diisostearyl sebacate | — | — | — | 60 | — |
| Di (C32C36) sebacate | — | — | — | — | 60 |
| Density (kg/cm³) | 55 | 54 | 55 | 55 | 55 |
| Number of cells/25 mm | 65 | 65 | 70 | 70 | 80 |
| Compression set (%) | 2 | 4 | 2 | 5 | 4 |
| Gas permeability (sec) | 20 | 25 | 45 | 55 | 25 |
| Water absorption (%) | 0.6 | 0.7 | 0.5 | 0.5 | 0.4 |
| Water-sealing properties (hr) | >24 | >24 | >24 | >24 | >24 |

TABLE 3

| Constituent | Example 10 | 11 | 12 | 13 | 14 | 15 | 16 |
|---|---|---|---|---|---|---|---|
| Polyol N-101 | 100 | 100 | 100 | 100 | 100 | 100 | 100 |
| Polyisocyanate MR-200 | 57.7 | 57.7 | 57.7 | 57.7 | 57.7 | 57.7 | 57.7 |
| Blowing agent | | | | | | | |
| Methylene chloride | 10 | 10 | 10 | 10 | 10 | 10 | 10 |
| Water | 2.4 | 2.4 | 2.4 | 2.4 | 2.4 | 2.4 | 2.4 |
| Catalyst DMAE | 0.5 | 0.5 | 0.5 | 0.5 | 0.5 | 0.5 | 0.5 |
| Foam stabilizer SH-193 | 1.0 | 1.0 | 1.0 | 1.0 | 1.0 | 1.0 | 1.0 |
| Ester | | | | | | | |
| Didecyl of dimer acid | 60 | — | — | — | — | — | — |
| Dioleyl of dimer acid | — | 60 | — | — | — | — | — |
| Distearyl of dimer acid | — | — | 60 | — | — | — | — |
| Di (C32C36) of dimer acid | — | — | — | 60 | — | — | — |
| Butadiene polyol-oleic acid compound | — | — | — | — | 60 | — | — |
| Bisphenol A-PO adduct-oleic acid compound | — | — | — | — | — | 60 | — |
| Castor oil-oleic acid compound | — | — | — | — | — | — | 60 |
| Density (kg/cm³) | 55 | 55 | 56 | 55 | 54 | 55 | 55 |
| Number of cells/25 mm | 80 | 80 | 80 | 80 | 80 | 80 | 80 |
| Compression set (%) | 5 | 5 | 6 | 5 | 5 | 6 | 5 |
| Gas permeability (sec) | 25 | 60 | 50 | 23 | 20 | 23 | 20 |
| Water absorption (%) | 0.4 | 0.4 | 0.3 | 0.4 | 0.5 | 0.7 | 0.8 |
| Water-sealing properties (hr) | >24 | >24 | >24 | >24 | >24 | >24 | >24 |

TABLE 4

| Constituent | Example 17 | 18 | 19 | 20 | 21 |
|---|---|---|---|---|---|
| Polyol | 100 | — | — | — | — |
| PPG-3000 | | | | | |
| AH405 | — | 100 | — | — | — |
| F-3010 | — | — | 100 | — | — |
| L-2010 | — | — | — | 100 | — |
| Teslac TA22-193 | — | — | — | — | 100 |
| Polyisocyanate MR-200 | 57.7 | 57.7 | 57.7 | 57.7 | 57.7 |
| Blowing agent | | | | | |
| Methylene chloride | 10 | 10 | 10 | 10 | 10 |
| Water | 2.4 | 2.4 | 2.4 | 2.4 | 2.4 |
| Catalyst DMAE | 0.5 | 0.5 | 0.5 | 0.5 | 0.5 |
| Foam stabilizer SH-193 | 1.0 | 1.0 | 1.0 | 1.0 | 1.0 |
| Distearyl of dimer acid | 60 | 60 | 60 | 60 | 60 |
| Density (kg/cm³) | 52 | 55 | 56 | 55 | 56 |
| Number of cells/25 mm | 65 | 75 | 80 | 80 | 80 |
| Compression set (%) | 5 | 5 | 5 | 5 | 5 |
| Gas permeability (sec) | 10 | 35 | 45 | 60 | 25 |
| Water absorption (%) | 0.4 | 0.4 | 0.4 | 0.4 | 0.4 |
| Water-sealing properties (hr) | >24 | >24 | >24 | >24 | >24 |

TABLE 5

| Constituent | Example 22 | 23 | 24 | Comparative Example 2 | 3 |
|---|---|---|---|---|---|
| Polyol N-101 | 100 | 100 | 100 | 100 | 100 |
| Polyisocyanate MR-200 | 57.7 | 57.7 | 57.7 | 57.7 | 57.7 |
| Blowing agent | | | | | |
| Methylene chloride | 10 | 10 | 10 | 10 | 10 |
| Water | 2.4 | 2.4 | 2.4 | 2.4 | 2.4 |
| Catalyst DMAE | 0.5 | 0.5 | 0.5 | 0.5 | 0.5 |
| Foam stabilizer SH-193 | 1.0 | 1.0 | 1.0 | 1.0 | 1.0 |
| Distearyl of dimer acid | 30 | 10 | 7 | 5 | — |
| Density (kg/cm³) | 51 | 45 | 45 | 43 | 41 |
| Number of cells/25 mm | 80 | 70 | 70 | 60 | 55 |
| Compression set (%) | 5 | 5 | 5 | 5 | 5 |
| Gas permeability (sec) | 20 | 15 | 10 | 5 | 3 |
| Water absorption (%) | 0.4 | 1.2 | 2.4 | 5 | 15 |
| Water-sealing properties (hr) | >24 | 12 | 8 | 1 | 5 min. |

TABLE 6

| Constituent | Example 25 | 26 | 27 | 28 |
|---|---|---|---|---|
| Polyol N-101 | 100 | 100 | 100 | 100 |
| Polyisocyanate MR-200 | 57.7 | 57.7 | 57.7 | 57.7 |
| Blowing agent | | | | |
| Methylene chloride | 10 | 10 | 10 | 10 |
| Water | 2.4 | 2.4 | 2.4 | 2.4 |
| Catalyst DMAE | 0.5 | 0.5 | 0.5 | 0.5 |
| Foam stabilizer SH-193 | 1.0 | 1.0 | 1.0 | 1.0 |
| Distearyl of dimer acid | 10 | 10 | 10 | 10 |

TABLE 6-continued

| Constituent | Example | | | |
|---|---|---|---|---|
| | 25 | 26 | 27 | 28 |
| Monofunctionally-terminated compound | | | | |
| Isostearyl alcohol | 5 | — | — | — |
| Oleyl alcohol | — | 5 | — | — |
| C32C36 higher alcohol | — | — | 5 | — |
| Emulmine 40 | — | — | — | 3 |
| Density (kg/cm$^3$) | 48 | 47 | 48 | 47 |
| Number of cells/25 mm | 65 | 65 | 65 | 65 |
| Compression set (%) | 4 | 6 | 5 | 4 |
| Gas permeability (sec) | 18 | 31 | 40 | 43 |
| Water absorption (%) | 0.9 | 0.9 | 0.8 | 0.7 |
| Water-sealing properties (hr) | >24 | >24 | >24 | >24 |

TABLE 7

| Constituent | Example | | | | |
|---|---|---|---|---|---|
| | 29 | 30 | 31 | 32 | 33 |
| Polyol N-101 | 100 | 100 | 100 | 100 | 100 |
| Polyisocyanate MR-200 | 57.7 | 57.7 | 57.7 | 57.7 | 57.7 |
| Blowing agent | | | | | |
| Methylene chloride | 10 | 10 | 10 | 10 | 10 |
| Water | 2.4 | 2.4 | 2.4 | 2.4 | 2.4 |
| Catalyst DMAE | 0.5 | 0.5 | 0.5 | 0.5 | 0.5 |
| Foam stabilizer SH-193 | 1.0 | 1.0 | 1.0 | 1.0 | 1.0 |
| Distearyl of dimer acid | 10 | 10 | 10 | 10 | 10 |
| Monofunctionally-terminated compound | | | | | |
| Nonipole 20 | 3 | — | — | — | — |
| Octylamine | — | 1.5 | — | — | — |
| Octadecylamine | — | — | 1.5 | — | — |
| Octadecyl isocyanate | — | — | — | 7 | 0.5 |
| Density (kg/cm$^3$) | 47 | 46 | 47 | 49 | 47 |
| Number of cells/25 mm | 65 | 70 | 70 | 65 | 70 |
| Compression set (%) | 4 | 6 | 5 | 6 | 4 |
| Gas permeability (sec) | 20 | 45 | 25 | 40 | 25 |
| Water absorption (%) | 0.6 | 0.7 | 0.5 | 0.5 | 0.4 |
| Water-sealing properties (hr) | >24 | >24 | >24 | >24 | >24 |

TABLE 8

| Constituent | Comparative Example | | | | | |
|---|---|---|---|---|---|---|
| | 4 | 5 | 6 | 7 | 8 | 9 |
| Polyol | | | | | | |
| PPG-3000 | 100 | — | — | — | — | — |
| N-101 | — | 100 | 100 | 100 | — | — |
| Teslac 2458 | — | — | — | — | 100 | 100 |
| Polyisocyanate T-80 | 36.9 | 37.3 | — | — | 37.3 | — |
| Polyisocyanate MR-200 | — | — | 57.7 | 57.7 | — | 57.7 |
| Blowing agent | | | | | | |
| Methylene chloride | 10 | 10 | 10 | 10 | 10 | 10 |
| Water | 2.4 | 2.4 | 2.4 | 2.4 | 2.4 | 2.4 |
| Catalyst | | | | | | |
| DMAE | 0.5 | 0.5 | 0.5 | 0.5 | 0.5 | 0.5 |
| Stannous octoate | 0.5 | 0.5 | — | — | 0.5 | — |
| Foam stabilizer SH-193 | 1.0 | 1.0 | 1.0 | 1.0 | 1.0 | 1.0 |
| Additive | | | | | | |
| Dioctyl phthalate | 60 | 60 | 60 | — | — | — |
| HV15 | — | — | — | 60 | 60 | 60 |
| Density (kg/cm$^3$) | 47 | 49 | 50 | 51 | 49 | 50 |

TABLE 8-continued

| Constituent | Comparative Example | | | | | |
|---|---|---|---|---|---|---|
| | 4 | 5 | 6 | 7 | 8 | 9 |
| Number of cells/25 mm | 40 | 50 | 80 | 65 | 50 | 65 |
| Compression set (%) | 2 | 2 | 2 | 2 | 15 | 20 |
| Gas permeability (sec) | — | — | 5 | 5 | 3 | 10 |
| Water absorption (%) | 23.5 | 8 | 8 | 3 | 1 | 1 |
| Water-sealing properties (hr) | — | — | 10 min. | 15 min. | 1 | 3 |

TABLE 9

| Constitution | Comparative Example | | | | | |
|---|---|---|---|---|---|---|
| | 10 | 11 | 12 | 13 | 14 | 15 |
| Polyol | | | | | | |
| Teslac 2458 | 100 | 100 | 100 | — | — | — |
| Teslac 2460 | — | — | — | 100 | — | — |
| F-3010 | — | — | — | — | 100 | 100 |
| Polyisocyanate MR-200 | 57.5 | 57.5 | 57.5 | 57.5 | 57.5 | 57.5 |
| Blowing agent | | | | | | |
| Methylene chloride | 10 | 10 | 10 | 10 | 10 | 10 |
| Water | 2.4 | 2.4 | 2.4 | 2.4 | 2.4 | 2.4 |
| Catalyst DMAE | 0.5 | 0.5 | 0.5 | 0.5 | 0.5 | 0.5 |
| Foam stabilizer SH-193 | 1.0 | 1.0 | 1.0 | 1.0 | 1.0 | 1.0 |
| Additive | | | | | | |
| FTR-6100 | 60 | 30 | — | 30 | 30 | — |
| Hiresol SAS-LH | — | 30 | — | 30 | 30 | — |
| Castor oil monool-MDI | — | — | — | — | — | 60 |
| Density (kg/cm$^3$) | 51 | 51 | 43 | 50 | 50 | 50 |
| Number of cells/25 mm | 65 | 65 | 50 | 65 | 65 | 80 |
| Compression set (%) | 20 | 20 | 7 | 7 | 2 | 2 |
| Gas permeability (sec) | — | 10 | 9 | 15 | 15 | 15 |
| Water absorption (%) | 1 | 1 | 1 | 1 | 1 | 3 |
| Water-sealing properties (hr) | — | 6 | 15 min. | 6 | 6 | 0.5 |

C32C36 as in di(C32C36) sebacate in Table 2, as in di(C32C36) of dimer acid in Table 3 and as in C32C36 higher alcohol in Table 6 indicates a mixture of $C_{32-36}$ monoalcohols.

The results in Tables 1 to 3 show that the samples of the examples comprising 60 parts by weight of various compounds containing at least one ester bond made of carboxylic acids such as stearic acid and monoalcohols such as decyl alcohol each have not less than 60 cells/25 mm, and exhibit a low compression set, a gas permeability of at least 18 seconds, a water absorption of less than 1% and water-sealing properties of not less than 24 hours. These samples all exhibit an excellent waterproofness.

In particular, the samples of Examples 10 to 13, which comprise a dimer acid as a carboxylic acid, exhibit an even lower water absorption.

Further, the samples of Examples 14 to 15, which correspond to the fourth aspect of the present invention, exhibit a low compression set and excellent water-sealing properties similarly to the other examples.

The results in Table 4 show that the samples of the examples comprising 60 parts by weight of a distearyl of dimer acid have from 65 to 80/25 mm and a low compression set regardless of the kind of the polyol used. These samples are also very excellent in waterproofness, including water absorption and water-sealing properties, though showing different gas permeabilities depending on the kind of the polyol used.

The foregoing results show that the present invention can employ a variety of polyols without the necessity of paying special attention to the hydrophobicity of the polyol. Further, the results in Table 5 show that the reduction of the added amount of the distearyl of dimer acid from 60 parts by weight to 30 parts by weight, 10 parts by weight and 7 parts by weight causes little deterioration in the number of cells, compression set and gas permeability but causes a deterioration in water absorption and water-sealing properties. Nevertheless, the results of these samples are superior to those of the comparative examples, proving that the effect of the blending of the compound containing at least one ester bond of the present invention can be exerted.

Moreover, the results in Tables 6 and 7 show that the samples of the examples comprising various monofunctionally-terminated compounds in addition to 10 parts by weight of a distearyl of dimer acid each have from 65 to 70 cells/25 mm and a low compression set regardless of the kind and added amount of the monofunctionally-terminated compound used.

Further, these samples are all very excellent in waterproofness, though showing some difference in gas permeability and water absorption depending on the kind of the monofunctionally-terminated compound used. It can be seen that these samples exhibit a further enhancement particularly in gas permeability and water-sealing properties as compared with the sample of Example 23, which comprises only 10 parts by weight of a distearyl of dimer acid.

Thus, the waterproof plastic foam of the present invention prepared by properly selecting the kind and added amount of the compound containing at least one ester bond or monofunctionally-terminated compound used and making a proper combination of these compounds can provide a product having a wide range of physical properties and waterproofness depending on the usage and purpose even if the added amount of the compound containing at least one ester bond is close to the lower limit.

On the other hand, as shown in Table 1, the sample of Comparative Example 1, which comprises 60 parts by weight of dioctyl sebacate, has no problem with respect to the number of cells and compression set but exhibits slightly poor gas permeability and water absorption, and water-sealing properties as very poor as 3 hours.

In Example 6, didecyl sebacate was used as the compound containing at least one ester bond. The results show that octyl alcohol containing a monoalcohol having 8 carbon atoms and decyl alcohol containing a monoalcohol having 10 carbon atoms are greatly different from each other in waterproofness.

As shown in Table 5, the sample of Comparative Example 2 comprises 5 parts by weight of a distearyl of dimer acid. As a result, the sample of Comparative Example 2, though showing the number of cells and compression set similar to those of the other examples, exhibits a drastic drop in gas permeability and water absorption from those of Example 24, which comprises 7 parts by weight of a distearyl of dimer acid, and water-sealing properties as small as 1 hour, which is a remarkable drop from that of Example 24.

It can further be seen that the sample of Comparative Example 3, free of the compound containing at least one ester bond, exhibits a slightly drop in the number of cells and is extremely poor in water-sealing properties, etc.

The results in Tables 8 and 9 show that the samples of Comparative Examples 4 to 15, which comprise various hydrophobic materials different from the compound containing at least one ester bond or monofunctionally-terminated compound of the present invention, are mostly greatly poorer than the various examples in both physical properties and waterproofness, though showing some difference from comparative example to comparative example.

In particular, the sample of Comparative Example 4, which comprises as an additive 60 parts by weight of dioctyl phthalate as a compound containing at least one ester bond made of phthalic acid as an aromatic dicarboxylic acid and octyl alcohol as a monoalcohol having 8 carbon atoms, has cells as small as $40/25$ mm (larger cell diameter) and exhibits a water absorption as remarkably great as 23.5%. The gas permeability and water-sealing properties of the sample were immeasurable because gas permeation or water leakage occurred immediately on the beginning of measurement.

Similarly, the sample of Comparative Example 5 is remarkably poor in waterproofness.

The example of Comparative Example 12, which comprises as a polyol a highly hydrophobic polyester polyol derived from a dimer acid, exhibits water-sealing properties as extremely poor as 15 minutes. This result proves that the incorporation of a hydrophobic material into the resin matrix does not suffice to provide a sufficient waterproofness.

Among the various comparative examples, Comparative Examples 11, 13 and 14, which comprise 30 parts by weight of a petroleum resin and 30 parts by weight of a petroleum liquid resin in combination, exhibit relatively good results, i.e., gas permeability of from 10 to 15 seconds, a water absorption of 1% and water-sealing properties of 6 hours. However, it can be seen that these comparative samples are inferior to the sample of Example 24, which comprises 7 parts by weight of the compound containing at least one ester bond of the present invention.

The present invention is not limited to the foregoing examples. Various modifications can be made without departing from the spirit or scope of the present invention.

For example, as the compound containing at least two active hydrogen groups there may be used a polyol component having a drastically enhanced hydrophobicity or the like.

Besides the compound containing at least one ester bond and the monofunctionally-terminated compound, an organic solvent such as cellosolve acetate, naphtha, xylene and toluene, a ketone such as acetone and methyl ethyl ketone, a carboxylic acid having not less than 8 carbon atoms such as stearic acid and/or salt thereof, and an essential oil may be blended, singly or in admixture, in an amount such that the inherent properties of the foam cannot be impaired, normally in an amount of from 0.5 to 5 parts by weight based on 100 parts by weight of the compound containing at least two active hydrogen groups to provide a further enhancement of waterproofness.

The waterproof plastic foam according to the first aspect of the present invention comprises as a hydrophobic material a compound containing at least one ester bond which comprises a highly hydrophobic long-chain hydrocarbon group connected thereto via an ester group to exhibit a slightly lower hydrophobicity than long-chain hydrocarbon compound. Accordingly, the hydrophobic material exhibits an enhanced compatibility with the polyol (compound containing at least two active hydrogen groups) or the like. Thus, an excellent workability can be provided during the preparation of the foamable composition.

The resulting foam is a homogeneous foam with fine cells. In the prior art, the addition of a long-chain hydrocarbon compound gives a larger cell diameter that leads to an excessive gas permeability. However, no such a trouble occurs in the present invention. Thus, very excellent water-sealing properties can be realized.

The hydrophobicity and the water-sealing properties can be well balanced particularly when the compound containing at least one ester bond is made of an alcohol in an amount defined in the second aspect of the present invention and a carboxylic acid. Further, a waterproof plastic foam having even better properties can be obtained when the distearyl of dimer acid as defined in the third aspect of the present invention is used.

Similar excellent results can be obtained when the specific compound containing at least one ester bond as defined in the fourth aspect of the present invention is used.

The added amount of the compound containing at least one ester bond is preferably from 10 to 70 parts by weight based on 100 parts by weight of the compound containing at least two active hydrogen groups as defined in the fifth and sixth aspects of the present invention. If the added amount of the compound containing at least one ester bond falls within this range, a plastic foam having an excellent waterproofness as defined in the seventh and eighth aspects of the present invention can be obtained without impairing the inherent properties of the foam.

Further, the compound containing at least one ester bond is preferably used in combination with a specific monofunctionally-terminated compound as defined in the ninth and tenth aspects of the present invention. The combined use of these components allows the excellent waterproofness of the foam to be maintained over a prolonged period of time.

While the invention has been described in detail and with reference to specific embodiments thereof, it will be apparent to one skilled in the art that various changes and modifications can be made therein without departing from the spirit and scope thereof.

What is claimed is:

1. A waterproof plastic foam obtained by a process which comprises foaming a foamable composition comprising a polyisocyanate, a compound containing at least two active hydrogen groups, a compound containing at least one ester bond, a catalyst, a blowing agent and a foam stabilizer, and then curing the foam, wherein said compound containing at least one ester bond is a product of the reaction of any one of a monocarboxylic acid having not less than 9 carbon atoms, an aliphatic dicarboxylic acid having not less than 8 carbon atoms and an alicyclic dicarboxylic acid having not less than 8 carbon atoms with a monoalcohol having not less than 10 carbon atoms, and said compound containing at least one ester bond is incorporated in an amount of from 7 to 100 parts by weight based on 100 parts by weight of said compound containing at least two active hydrogen groups.

2. The waterproof plastic foam according to claim 1, wherein said monoalcohol and monocarboxylic acid each contain from 14 to 36 carbon atoms and said aliphatic dicarboxylic acid or alicyclic dicarboxylic acid contains from 15 to 36 carbon atoms.

3. The waterproof plastic foam according to claim 1, wherein said monoalcohol comprises n-stearyl alcohol and/ or isostearyl alcohol and said alicyclic dicarboxylic acid is a dimer acid.

4. A waterproof plastic foam obtained by a process which comprises foaming a foamable composition comprising a polyisocyanate, a compound containing at least two active hydrogen groups, a compound containing ester bonds, a catalyst, a blowing agent and a foam stabilizer, and then curing the foam, wherein said compound containing ester bonds is made of oleic acid and one component selected from the group consisting of butadiene polyol, adduct of bisphenol A with propylene oxides and castor oil, and said compound containing ester bonds is incorporated in an amount of from 7 to 100 parts by weight based on 100 parts by weight of said compound containing at least two active hydrogen groups.

5. The waterproof plastic foam according to claim 1, wherein said compound containing at least one ester bond is incorporated in an amount of from 10 to 70 parts by weight based on 100 parts by weight of said compound containing at least two active hydrogen groups.

6. The waterproof plastic foam according to claim 4, wherein said compound containing ester bonds is incorporated in an amount of from 10 to 70 parts by weight based on 100 parts by weight of said compound containing at least two active hydrogen groups.

7. The waterproof plastic foam according to claim 1, which exhibits a gas permeability of from 10 to 60 seconds as determined in accordance with JIS P 8117, a water absorption of from 0.3 to 1.2% calculated in accordance with the following equation:

$$\text{\% Water absorption} = \{\text{weight change (g) by dipping/volume (cm}^3\text{)} \text{ of 50\% compressed specimen}\} \times 100$$

wherein the weight change (g) by dipping represents a weight increase of a 50×50×20 (thick) mm specimen before and after such a treatment that the specimen is vertically compressed by a factor of 50% to a thickness of 10 mm and is then dipped in water of 23° C. to a depth of 10 cm for 24 hours, and the volume (cm³) of 50% compressed specimen represents a volume of the specimen vertically compressed by a factor of 50%, and water-sealing properties of not less than 12 hours determined by the time required until water oozes from an external surface of a U-shaped portion of a sample which is prepared by forming a specimen having a 15 mm×15 mm section into a U-shaped material, clamping it with two sheets of acrylic resin plates to vertically compress it to a factor of 50%, setting it upright, and then pouring water into the U-shaped portion to a height of 100 mm from the inner surface of the U-shaped portion.

8. The waterproof plastic foam according to claim 4, which exhibits a gas permeability of from 10 to 60 seconds as determined in accordance with JIS P 8117, a water absorption of from 0.3 to 1.2% calculated in accordance with the following equation:

$$\text{Water absorption} = \{\text{weight change (g) by dipping/volume (cm}^3\text{) of 50\% compressed specimen}\} \times 100$$

wherein the weight change (g) by dipping represents a weight increase of a 50×50×20 (thick) mm specimen before and after such a treatment that the specimen is vertically compressed by a factor of 50% to a thickness of 10 mm and is then dipped in water of 23° C. to a depth of 10 cm for 24 hours, and the volume (cm³) of 50% compressed specimen represents a volume of the specimen vertically compressed by a factor of 50%, and water-sealing properties of not less than 12 hours determined by the time required until water oozes from an external surface of a U-shaped portion of a sample which is prepared by forming a specimen having a 15 mm×15 mm section into a U-shaped material, clamping it with two sheets of acrylic resin plates to vertically compress it to a factor of 50%, setting it upright, and then pouring water into the U-shaped portion to a height of 100 mm from the inner surface of the U-shaped portion.

9. The waterproof plastic foam according to claim 1, which comprises a monofunctionally-terminated compound containing a hydrocarbon group containing not less than 6 carbon atoms at one end or in the middle position and one active group reactive with an isocyanate group contained in said polyisocyanate or one active group reactive with an active hydrogen group contained in said compound containing at least two active hydrogen groups at the other end, with these active groups being bonded to a carbon atom at the end of the molecular chain or a carbon atom adjacent to the carbon atom.

10. The waterproof plastic foam according to claim 4, which comprises a monofunctionally-terminated compound containing a hydrocarbon group containing not less than 6 carbon atoms at one end or in the middle position and one active group reactive with an isocyanate group contained in said polyisocyanate or one active group reactive with an active hydrogen group contained in said compound containing at least two active hydrogen groups at the other end, with these active groups being bonded to a carbon atom at the end of the molecular chain or a carbon atom adjacent to the carbon atom.

11. The waterproof plastic foam according to claim 9, wherein said monofunctionally-terminated compound comprises one or more compounds selected from the group consisting of monoisocyanate, monoalcohol and monoamine.

12. The waterproof plastic foam according to claim 10, wherein said monofunctionally-terminated compound comprises one or more compounds selected from the group consisting of monoisocyanate, monoalcohol and monoamine.

13. The waterproof plastic foam according to claim 9, wherein said monofunctionally-terminated compound is used in an amount of from 0.1 to 35 parts by weight based on 100 parts by weight of the compound containing at least two active hydrogen groups.

14. The waterproof plastic foam according to claim 10, wherein said monofunctionally-terminated compound is used in an amount of from 0.1 to 35 parts by weight based on 100 parts by weight of the compound containing at least two active hydrogen groups.

15. The waterproof plastic foam according to claim 9, which exhibits a gas permeability of from 18 to 55 seconds as determined in accordance with JIS P 8117, a water absorption of from 0.4 to 0.9% calculated in accordance with the following equation:

$$\% \text{ Water absorption} = \{\text{weight change (g) by dipping/volume (cm}^3\text{)} \text{ of 50\% compressed specimen}\} \times 100$$

wherein the weight change (g) by dipping represents a weight increase of a 50×50×20 (thick) mm specimen before and after such a treatment that the specimen is vertically compressed by a factor of 50% to a thickness of 10 mm and is then dipped in water of 23° C. to a depth of 10 cm for 24 hours, and the volume (cm$^3$) of 50% compressed specimen represents a volume of the specimen vertically compressed by a factor of 50%, and water-sealing properties of not less than 12 hours determined by the time required until water oozes from an external surface of a U-shaped portion of a sample which is prepared by forming a specimen having a 15 mm×15 mm section into a U-shaped material, clamping it with two sheets of acrylic resin plates to vertically compress it to a factor of 50%, setting it upright, and then pouring water into the U-shaped portion to a height of 100 mm from the inner surface of the U-shaped portion.

16. The waterproof plastic foam according to claim 10, which exhibits a gas permeability of from 18 to 55 seconds as determined in accordance with JIS P 8117, a water absorption of from 0.4 to 0.9% calculated in accordance with the following equation:

$$\% \text{ Water absorption} = \{\text{weight change (g) by dipping/volume (cm}^3\text{)} \text{ of 50\% compressed specimen}\} \times 100$$

wherein the weight change (g) by dipping represents a weight increase of a 50×50×20 (thick) mm specimen before and after such a treatment that the specimen is vertically compressed by a factor of 50% to a thickness of 10 mm and is then dipped in water of 23° C. to a depth of 10 cm for 24 hours, and the volume (cm$^3$) of 50% compressed specimen represents a volume of the specimen vertically compressed by a factor of 50%, and water-sealing properties of not less than 12 hours determined by the time required until water oozes from an external surface of a U-shaped portion of a sample which is prepared by forming a specimen having a 15 mm×15 mm section into a U-shaped material, clamping it with two sheets of acrylic resin plates to vertically compress it to a factor of 50%, setting it upright, and then pouring water into the U-shaped portion to a height of 100 mm from the inner surface of the U-shaped portion.

17. The waterproof plastic foam according to claim 1, wherein said compound containing at least two active hydrogen groups is a polyol.

18. The waterproof plastic foam according to claim 4, wherein said compound containing at least two active hydrogen groups is a polyol.

19. The waterproof plastic foam according to claim 1, wherein said compound containing at least two active hydrogen groups is a polyamine.

20. The waterproof plastic foam according to claim 4, wherein said compound containing at least two active hydrogen groups is a polyamine.

* * * * *